(12) United States Patent
Williams et al.

(10) Patent No.: US 11,804,910 B1
(45) Date of Patent: *Oct. 31, 2023

(54) SYSTEMS AND METHODS FOR COMMON PATH DISTORTION DETECTION AND MITIGATION

(71) Applicant: CABLE TELEVISION LABORATORIES, INC., Louisville, CO (US)

(72) Inventors: Thomas Holtzman Williams, Longmont, CO (US); Luis Alberto Campos, Superior, CO (US); Jason W. Rupe, Lafayette, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/509,789

(22) Filed: Oct. 25, 2021

Related U.S. Application Data

(63) Continuation of application No. 16/384,846, filed on Apr. 15, 2019, now Pat. No. 11,159,250.
(Continued)

(51) Int. Cl.
| | | |
|---|---|---|
| H04B 17/00 | (2015.01) | |
| H04B 17/29 | (2015.01) | |
| H04H 20/77 | (2008.01) | |
| H04L 12/28 | (2006.01) | |
| H04B 7/10 | (2017.01) | |
| H04L 5/00 | (2006.01) | |

(52) U.S. Cl.
CPC .......... *H04B 17/0085* (2013.01); *H04B 7/10* (2013.01); *H04B 17/29* (2015.01); *H04H 20/77* (2013.01); *H04L 12/2801* (2013.01); *H04L 5/0007* (2013.01)

(58) Field of Classification Search
CPC .............. H04L 12/2801; H04L 5/0007; H04H 20/77; H04B 7/10; H04B 17/29; H04B 17/0085
See application file for complete search history.

(56) References Cited

U.S. PATENT DOCUMENTS 7,024,680 B2 * 4/2006 Howard ................ H04L 1/0006
455/423
9,414,126 B1 * 8/2016 Zinevich ................. H04B 3/46
(Continued)

*Primary Examiner* — Benjamin H Elliott, IV
(74) *Attorney, Agent, or Firm* — Josh C. Snider

(57) ABSTRACT

A transmitter is configured to transmit data to a receiver over a communications network. The transmitter includes a memory for storing computer-executable instructions and a processor in operable communication with the memory. The processor is configured to (i) collect spectrum data of a spectral band over a first sampling interval, and (ii) store the collected spectrum data in the memory. The transmitter further includes a common path distortion (CPD) detection unit configured to (i) sample the collected spectrum data, over a second sampling interval less than the first sampling interval, for a plurality of sub-bands within the spectral band, (ii) analyze the spectral band and each sub-band for indications of common path distortion, and (iii) inject a test signal configured for detection at a headend of the communications network. The transmitter further includes a modem portion configured to operably communicate with the headend and the receiver.

20 Claims, 13 Drawing Sheets

Related U.S. Application Data

(60) Provisional application No. 62/657,681, filed on Apr. 13, 2018.

(56) References Cited

U.S. PATENT DOCUMENTS

| | | | |
|---|---|---|---|
| 11,159,250 B2* | 10/2021 | Williams | H04L 12/2801 |
| 2002/0086641 A1* | 7/2002 | Howard | H04L 12/2801 |
| | | | 455/67.11 |
| 2005/0058082 A1* | 3/2005 | Moran, III | H04L 1/0003 |
| | | | 370/332 |
| 2006/0141971 A1* | 6/2006 | Howard | H04L 1/0006 |
| | | | 455/283 |
| 2006/0208945 A1* | 9/2006 | Kolanek | H01Q 3/2605 |
| | | | 342/383 |
| 2008/0062888 A1* | 3/2008 | Lusky | H04L 1/0001 |
| | | | 370/252 |
| 2008/0319689 A1* | 12/2008 | Williams | H04N 17/00 |
| | | | 702/59 |
| 2009/0328126 A1* | 12/2009 | Sinde | H04N 17/00 |
| | | | 725/125 |
| 2010/0070228 A1* | 3/2010 | Chappell | H04N 21/6118 |
| | | | 702/79 |
| 2012/0007770 A1* | 1/2012 | Walker | G01S 7/4052 |
| | | | 342/174 |
| 2013/0266310 A1* | 10/2013 | Fox | H04B 3/04 |
| | | | 375/222 |
| 2016/0119662 A1* | 4/2016 | Zinevich | H04N 21/2404 |
| | | | 725/95 |
| 2017/0063569 A1* | 3/2017 | Currivan | H04L 25/0226 |
| 2018/0219621 A1* | 8/2018 | Zinevich | H04B 10/0775 |
| 2019/0319718 A1* | 10/2019 | Williams | H04B 17/29 |
| 2019/0349027 A1* | 11/2019 | Soltanpur | H04B 3/46 |

\* cited by examiner

SYSTEMS AND METHODS FOR COMMON PATH DISTORTION DETECTION AND MITIGATION

CROSS REFERENCE TO RELATED APPLICATIONS

This application is a continuation of U.S. patent application Ser. No. 16/384,846, filed Apr. 15, 2019. U.S. patent application Ser. No. 16/384,846 claims the benefit of and priority to U.S. Provisional Patent Application Ser. No. 62/657,681, filed Apr. 13, 2018, the disclosure of which is herein incorporated by reference in its entirety.

BACKGROUND

The field of the disclosure relates generally to transmission systems, and more particularly, to distortion and noise mitigation for wired, wireless, and optical digital transmission systems.

Conventional digital transmission systems typically include both linear and non-linear distortion. Some conventional digital transmission systems utilize orthogonal frequency division multiplexing (OFDM) and orthogonal frequency division multiple access (OFDMA) techniques for transmitting carrier signals using technology such as the Data Over Cable Service Interface Specification (DOCSIS), or DOCSIS version 3.1, as well as other wireless standards. OFDM implements a plurality of different subcarriers that are harmonics of a fundamental to obtain orthogonality. DOCSIS specifications typically utilize OFDM for downstream signals and OFDMA for upstream signals, and OFDM and OFDMA are complimentary.

One type of conventional digital transmission system is Radio Frequency over Glass (RFoG). RFoG is defined by the Society of Cable Telecommunications Engineers (SCTE) in SCTE 174, and transmits DOCSIS RF signals to a home, or customer premises, over fiber optics. RFoG allows cable operators to use an existing Modem Termination System (MTS) to transmit radio frequencies (RF) over a passive optical network (PON) architecture to a modem (e.g., an optical network unit (ONU), a cable modem (CM), etc.), at the home/customer premises. The fiber optic transmission lines used in RFoG provide greater downstream and upstream bandwidth than do conventional coaxial cables. RFoG typically reduces operational expenses by allowing the substitution of passive components (e.g., splitters) for active components (e.g. amplifiers), thereby reducing the power requirements for the system, but also the reach of the system.

Both OFDM and OFDMA are known to also be used in hybrid fiber coaxial (HFC) networks, where distortion is known to frequently occur. DOCSIS 3.1 transmissions are therefore prevalent for both the RFoG network and the HFC network, both of which may include a cable plant. In the RFoG network, an ONU is typically located at the customer premises, and serves as the transport layer for RF video, voice, and DOCSIS technologies in deep fiber and fiber-to-the-home (FTTH) access networks. In many instances, the ONU also functions as or substitutes for a modem/CM.

Common path distortion (CPD) is a known form of nonlinear distortion affecting the cable plant when downstream signals mix in a corrosion diode. The mixed signals may generate undesirable distortion products in the upstream band, typically within the 5-42 MHz spectral range. SCTE-109 provides a test procedure for CPD. According to the SCTE-109 procedure, two continuous wave/waveform (CW) carriers are injected at high level in the downstream signal. The two CW carriers are separated by a frequency that propagates in the reverse direction upstream where noise is low and where there is vacant bandwidth (e.g., 800 MHz and 840.5 MHz have been used, producing 40.5 MHz). Thus, if there is a CW carrier at 40.5 MHz, the respective node has a corrosion diode. However, because the 40.5 MHz difference product of the SCTE-109 procedure is frequently modulated at 120 Hz, the corrosion diode is affected by AC powering. Moreover, in this SCTE implementation, the distance to the diode is not revealed by the CW at the headend, nor if there are more than one corrosion diode.

CPD may, for example, be caused by corrosion diodes mixing upstream data signals, and the distortion products thereof will land in the upstream band. Furthermore, because the typical downstream signal is no digital, CPD appears as flat noise. Additionally, in some systems, the noise floor may vary with temperature. Another problematic form of distortion is common mode distortion, which is also referred to as XB3 noise, or the XB3 noise hump, in reference to a conventionally prevalent XB3 modem by one manufacturer, but also seen from other devices from other manufacturers. Accordingly, there is a need to detect and mitigate these noise and distortion effects, and within existing standards in the field. Additionally, it is desirable to further determine the distance to a corrosion diode, as well as how many corrosion diodes may be at issue.

BRIEF SUMMARY

In an embodiment, a transmitter is configured to transmit data to a receiver over a communications network. The transmitter includes a memory for storing computer-executable instructions and a processor in operable communication with the memory. The processor is configured to (i) collect spectrum data of a spectral band over a first sampling interval, and (ii) store the collected spectrum data in the memory. The transmitter further includes a common path distortion (CPD) detection unit configured to (i) sample the collected spectrum data, over a second sampling interval less than the first sampling interval, for a plurality of sub-bands within the spectral band, (ii) analyze the spectral band and each sub-band for indications of common path distortion, and (iii) inject a test signal configured for detection at a headend of the communications network. The transmitter further includes a modem portion configured to operably communicate with the headend and the receiver.

In an embodiment, a method is provided for detecting common path distortion on a carrier signal in a communications network. The method is implemented by a communications device having a processor in communication with a memory. The method includes steps of collecting spectrum data of a spectral band over a first sampling interval, storing the collected spectrum data in the memory, and sampling the collected spectrum data for a plurality of sub-bands within the spectral band. The sampling is performed over a second sampling interval less than the first sampling interval. The method further includes a step of analyzing the spectral band and each sub-band for indications of common path distortion.

BRIEF DESCRIPTION OF THE DRAWINGS

These and other features, aspects, and advantages of the present disclosure will become better understood when the following detailed description is read with reference to the following accompanying drawings, in which like characters represent like parts throughout the drawings.

Figure 1:
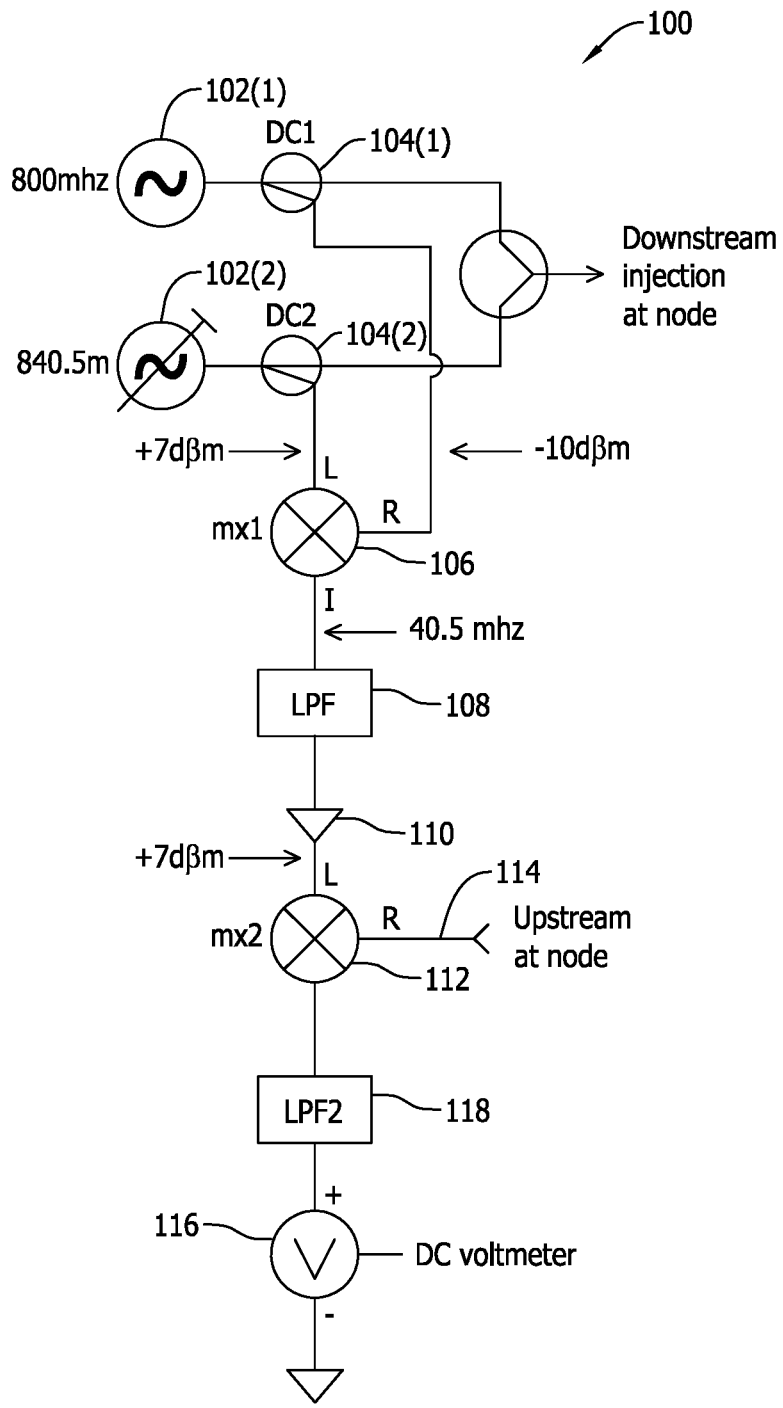
FIG. 1 is a schematic illustration depicting an exemplary measurement system.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random access memory (RAM), and a computer-readable nonvolatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events occur substantially instantaneously.

As described herein, systems and methods are provided for locating CPD using a modified SCTE-109 procedure, testing wiring integrity (e.g., house wiring) using a switchable common mode test signal, automatically determining CPD from upstream noise floor changes, and a transmission system having adaptive polarization for each receiver antenna. The present embodiments may each be implemented separately, or together with one or more of the several innovative embodiments described herein.

Common Path Distortion Location

As described above, CPD is a nonlinear distortion affecting a cable plant when downstream signals mix in a corrosion diode and generate distortion products in the SCTE-109 procedure is affected by AC power, and limited by its present inability to determine the distance to the diode and/or the number diodes. According to the modified SCTE-109 procedure of the present embodiments, these conventional deficiencies may be remedied by first adjusting the frequency of one of the downstream carriers. The resultant phasor of the received upstream CW signal will spin relative to a locally generated headend difference signal. According to this modified procedure, the rate of spin will be proportional to the distance (i.e., the delay) to the diode and back again, where:

$$\text{Delay} = d\varphi/d\omega$$

where $d\varphi$ represents the measured spin and $d\omega$ represents the change of frequency.

FIG. 1 is a schematic illustration depicting an exemplary measurement system 100. In an exemplary embodiment, measurement system 100 is configured to implement the modified SCTE-109 procedure, described above, to provide a determination of the distance to a corrosion diode. In exemplary operation of measurement system 100, first and second downstream signals 102(1) and 102(2), respectively (800 MHz and 840.5 MHz, in this example), are injected for sampling by respective directional couplers 104(1), 104(1) (i.e., DC1 and DC2), and then fed to a first mixer (MX1) 106 to produce the difference frequency (40.5 MHz, in this example). In an exemplary embodiment, first mixer 106 is a double balanced mixer. From first mixer 106, the difference frequency is filtered by a low pass filter 108, and then amplified by an amplifier 110 for as a local oscillator (LO) for a second mixer (MX2) 112. In further operation of measurement system 100, an RF port (not separately shown) of second mixer 112 is fed with an upstream signal 114, and if there is a distortion CW, a DC voltage will appear at the IF port (also not separately shown) of second mixer 112 for measurement with a voltmeter 116.

In the exemplary embodiment second downstream signal 102(2) (e.g., 840.5 MHz) is adjusted (by 10 kHz, in this example), resulting in a full sine wave cycle at DC voltmeter 116. Therefore, given 2*Π (approximately 6.28) radians change for a 2*Π*100,000 frequency change, the round trip delay of the signal over a distance d of one mile will be approximately 10 μs, assuming a propagation velocity $v_P$ of approximately 1 ft/ns, and a round trip of 2*5280 ft. In an embodiment, a second low pass filter (LPF2) 118 is provided between second mixer 112 and voltmeter 116, and functions to keep voltmeter 116 from seeing AC, or being negatively affected thereby. In an embodiment, second low pass filter 118 has a corner frequency within the range of 10-40 Hz, which may effectively reject power line harmonics.

In an exemplary embodiment, injection of first and second downstream signals 102(1) and 102(2) occurs at the node (not shown). In at least one embodiment, and particularly in a case where the distance from the corrosion diode to the fiber test point is significant, a delay line (e.g., several hundred feet long) may be provided in series with one or both of low pass filters 108, 118 to avoid or mitigate the frequency shift on the 840.5 MHz carrier of second downstream signal 102(2).

The modified SCTE procedure implemented by measurement system 100 therefore resolves conventional problems experienced from CPD throbbing at 120 Hz. In an alternative embodiment of measurement system 100, second mixer 112 is a complex demodulator, and a 90-degree shifted quadrature 40.5 MHz signal may be accomplished, for example, using a Hilbert transformer operating on the in-phase signal.

In a case where the pattern resulting from a linear frequency shift is not a pure sine wave (i.e., a more complicated shape), it may be determined that likely more than one corrosion diode is active. In this embodiment, system 100 may be further configured to reveal the locations such multiple diodes by performing an inverse Fourier transform on the complex spectral data, and then optionally windowing the transformed data.

Wiring Integrity Testing Using a Switchable Common Mode Test Signal

Figure 2:
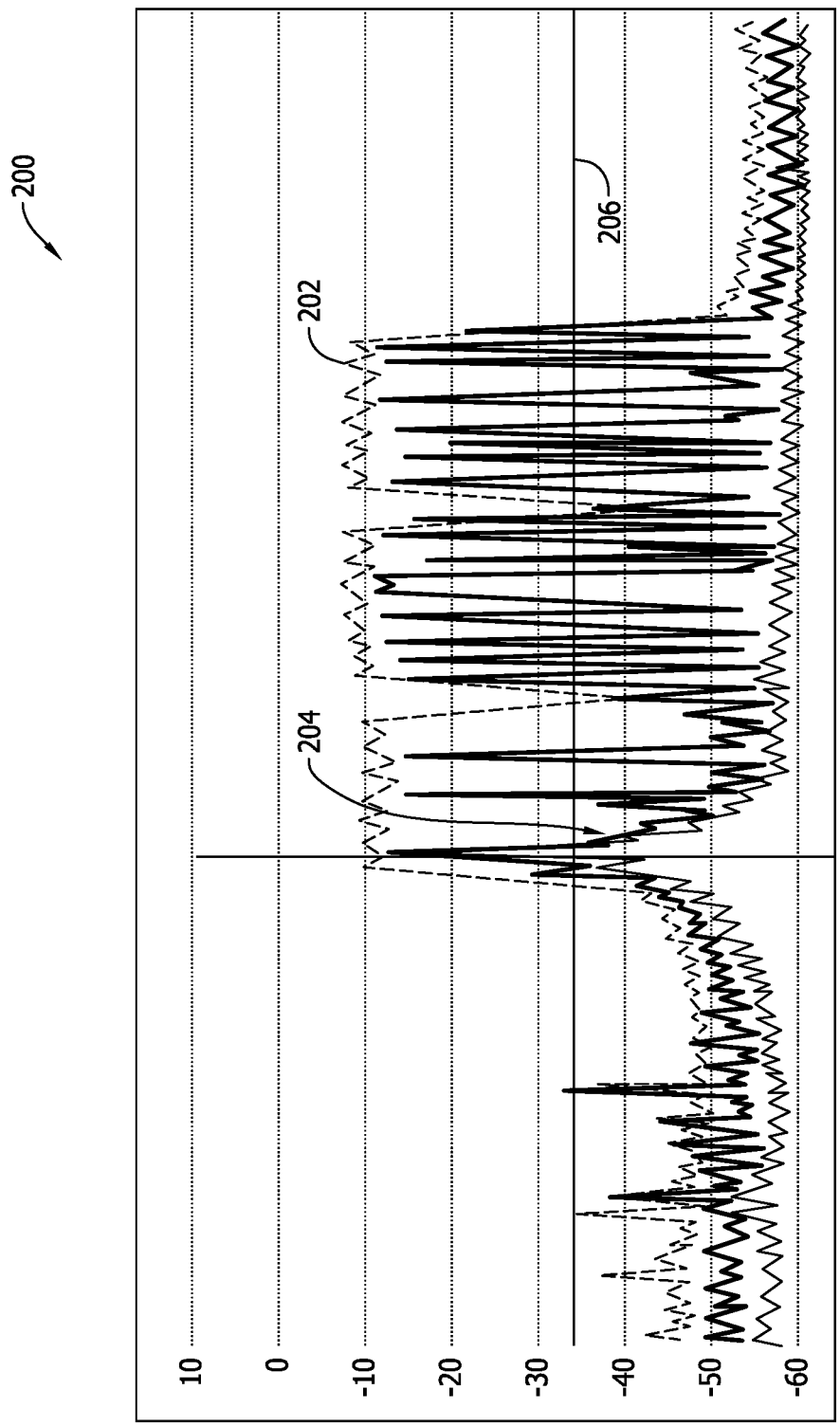
FIG. 2 is a graphical illustration depicting a spectral plot.

FIG. 2 is a graphical illustration depicting a spectral plot 200. Spectral plot 200 includes a carrier subplot 202 and a common mode distortion subplot 204. As can be seen in the embodiment illustrated in FIG. 2, a significant portion of the common mode distortion of subplot 204 occurs above their noise floor 206 of the carriers of subplot 202. This distortion problem (also known as XB3 noise hump) has become both common and pervasive in upstream cable signals, and frequently results from loose gateway connectors (e.g., on an XB3 gateway). For example, in the case where customer premises (e.g., a house) has bad shielding integrity, switching regulator noise launched on the outside of the F-connector of a modem may travel upstream and interfere with the data services. The present embodiments solve this problem by rendering the noise switchable. In the example depicted in FIG. 2, the common mode test signal is made switchable, from 22 MHz (where data services may occur) to 12 MHz (where there are no services), and the test noise is generated therein. In an exemplary embodiment, the test signal noise is switched by shorting out a filter component. In an alternative embodiment, the test signal is generated using the modem transmitter, but routed to the outside of the F-connector instead of the center conductor.

Accordingly, a modem or set top box (STB) located at the customer premises is configured to inject, on command, a 10-15 MHz common mode signal on the outside of a coaxial F-connector that connects the modem/STB to the cable plant. At the headend, the injected signal may then be received, and from this received signal it may be determined that the shielding integrity of the customer premises is deficient, faulty, or failed. That is, the modem/STB is herein configured to test for house wiring integrity by injecting a test current on the outside of the F-connector as a common mode signal. In an exemplary embodiment, the test signal is generated by the modem transmitter, and may be switched on and off at will. At the headend, when the test signal is observed on a return spectrum analyzer, it may be determined that the premises transmitting the test signal has defective coaxial wiring.

Automatic Common Path Distortion Detection

In an exemplary embodiment, the present systems and methods reveal and determine CPD utilizing observed changes in the noise floor of an upstream cable system. In an exemplary embodiment, a waterfall plot effectively distinguishes CPD from ingress, for example, which is frequency selective. In the exemplary embodiment, the CPD plot exhibits rapid steps in the noise floor, which are different from thermal effects, which will appear gradual. These innovative CPD detection techniques may be accomplished through dedicated hardware units, novel software algorithms, or combination thereof.

In the exemplary embodiments described further below, CPD detection techniques are applied with respect to a significantly large frequency band of interest (5-40 MHz, in this example), and then to sub-bands of any width as collected by the relevant data collection process thereof (e.g., up to widths of 1 MHz or 5 MHz). Accordingly, by applying the present CPD detection techniques to each sub-band, different types of noise may be advantageously detected and distinguished from one another. For example, a small jump on the entire band might actually be due to a large jump in a single sub-band, which would indicate non-CPD noise, whereas a jump in all sub-bands would indicate CPD noise.

Thus, the present CPD detection techniques are particularly useful in determining both abrupt changes in the overall noise, and also relatively small differences between the noise in sub-bands. The advantageous ability of the present embodiments to consider both such conditions together significantly increases the detection capabilities and accuracy.

In at least one embodiment, the CPD detection technique detects CPD by sampling the noise level for the full band of interest, and then divides by the difference (e.g., maximum value–minimum value) in the sub-band noise levels. In this particular exemplary technique is useful for distinguishing the CPD statistic from other noise sources, since the other noise sources would exhibit a significantly lower statistic due to having a higher (max–min) sub-band value.

From these innovative CPD detection techniques, an automatic CPD detector for proactive network maintenance (PNM) may be configured from waterfall plots of upstream noise floors. These techniques may be particularly useful with respect to the cable network paradigm, for example, by tracking the noise floor of a upstream cable system and using the tracked information as an indicator of a CPD problem. An example of this CPD detection technique is described below with respect to FIG. 3.

Figure 3:
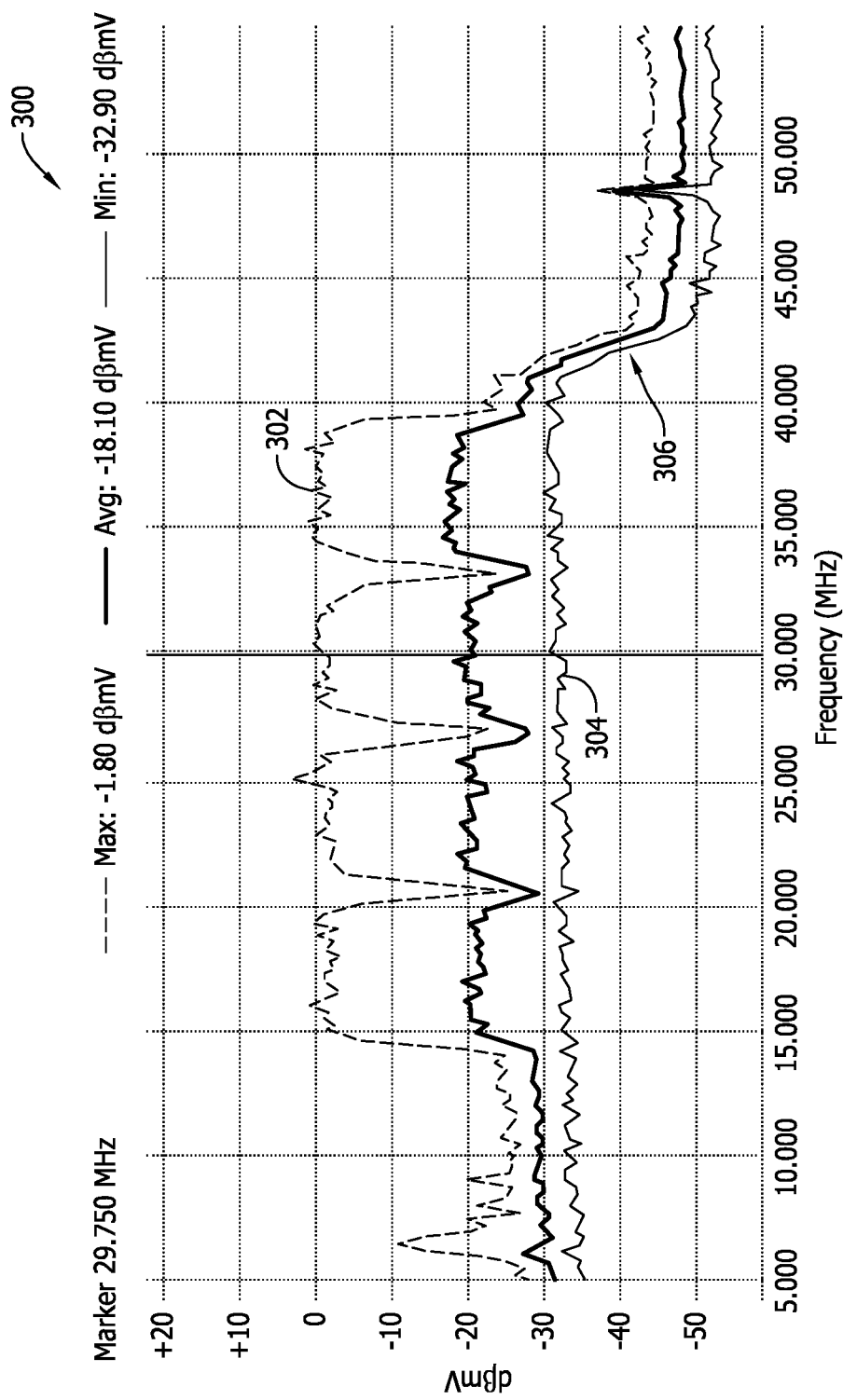
FIG. 3 is a graphical illustration depicting a spectral plot.

FIG. 3 is a graphical illustration depicting a spectral plot 300. In the exemplary embodiment depicted in FIG. 3, spectral plot 300 includes a data subplot 302 and a noise floor subplot 304. A rapid drop region 306 from the elevated noise floor of noise floor subplot 304 indicates CPD. That is, as illustrated in FIG. 3, in a system affected by CPD, the CPD is indicated by a sudden or rapid step up in a plot of the noise floor, or a similar step down (e.g., region 306), because CPD is normally intermittent by nature. In contrast, ingress (i.e., caused by powerline noise, broadcast signals, etc.) is generally frequency selective, favoring lower frequencies (e.g., below the range of 15-20 MHz). In this example, the spectral data of spectral plot 300 is obtained using the triggered Upstream Spectrum Analysis MIB from the DOCSIS 3.1 MIB. The spectral data may also be obtained using a minimum hold function from a spectrum analyzer. These exemplary embodiments though, are provided for illustrative purposes, and not in a limiting sense.

Figure 4:
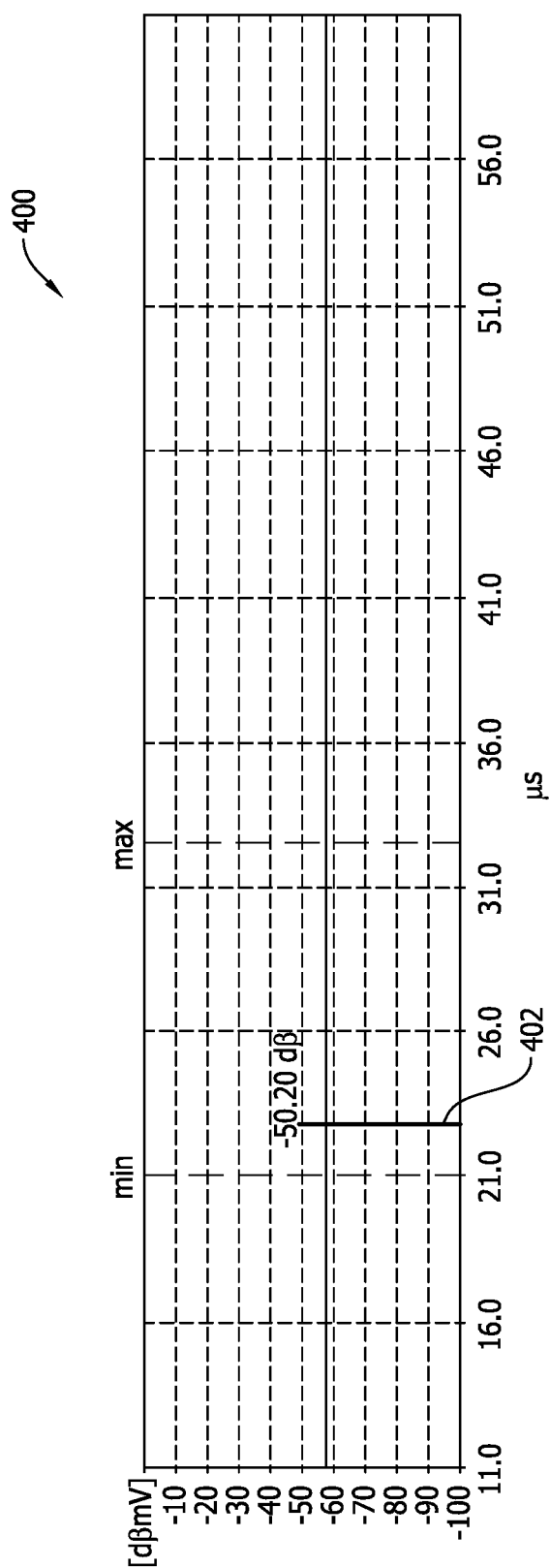
FIG. 4 is a graphical illustration depicting a common path distortion detection plot according to a cross correlation processing technique.

FIG. 4 is a graphical illustration depicting a common path distortion detection plot 400 according to a cross correlation processing technique. In the embodiment depicted in FIG. 4, plot 400 represents only the results of the cross correlation processing of the CPD detection technique implemented with respect to FIG. 3. That is, instead of displaying the entire correlation function, the results of the cross correlation may be displayed as a single spike 402 indicating the time distance to the impairment (22.8 µs, in this example) and the amplitude thereof (−50.2 dB, and this example). Thus, according to the modified CPD detection techniques of the present embodiments, the amplitude in distance to impairments may be quickly and efficiently determined, and within the scope of existing SCTE standards.

Figure 5:
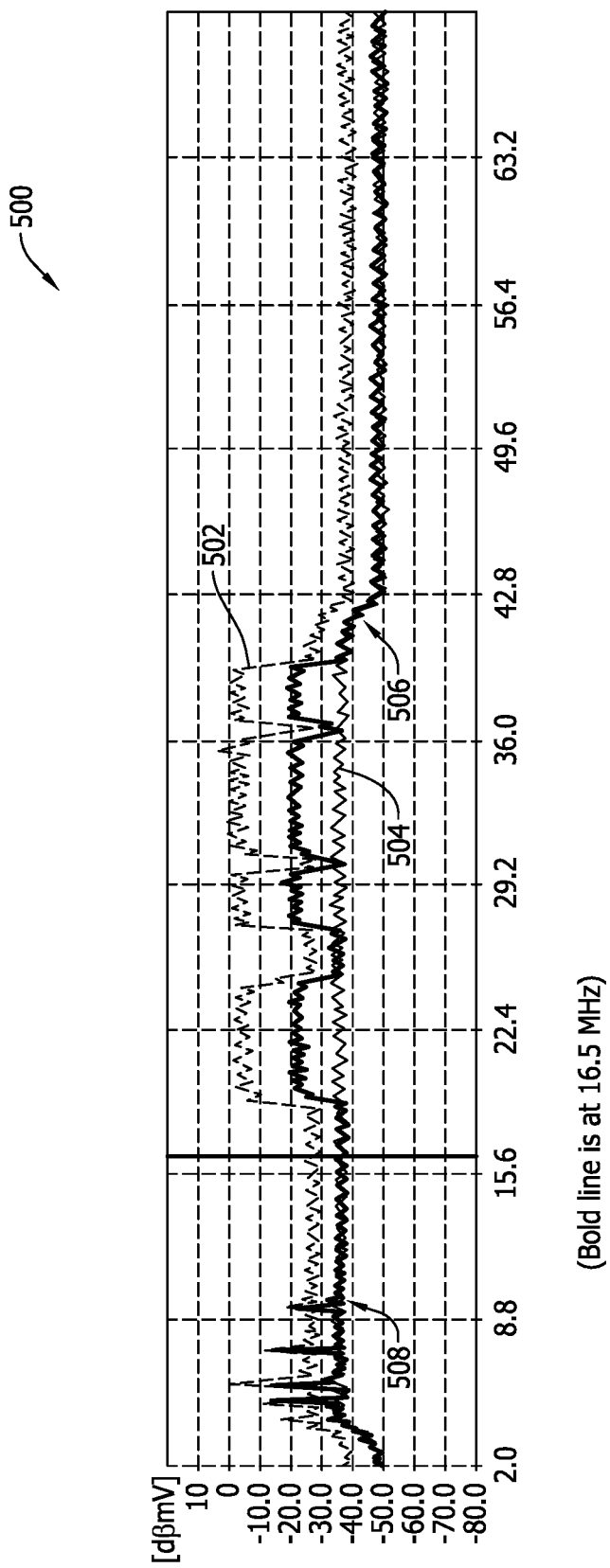
FIG. 5 is a graphical illustration depicting a spectral plot according to the cross correlation processing technique of FIG. 4.

FIG. 5 is a graphical illustration depicting a spectral plot 500 according to the cross correlation processing technique of FIG. 4. In the exemplary embodiment depicted in FIG. 5, spectral plot 500 is similar to spectral plot 300, FIG. 3, and includes a data subplot 502 and a noise floor subplot 504 exhibiting a rapid drop region 506 from the elevated noise floor of subplot 504 (e.g., indicating CPD). That is, the elevated noise level of noise floor subplot 504 is a result of the presence of CPD. Accordingly, the return carriers on the network have an affected carrier-to-noise ratio (CNR) 508. The CPD may then be more accurately determined by plotting the noise floor data over time, as illustrated below with respect to FIG. 6.

Figure 6:
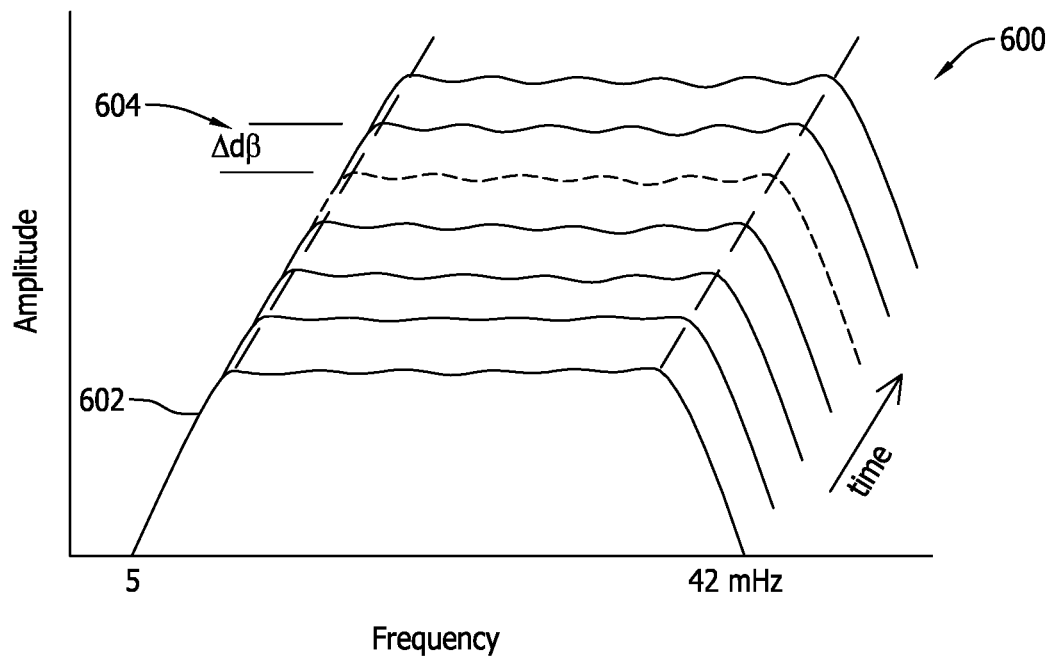
FIG. 6 is a graphical illustration depicting a three dimensional noise plot.

FIG. 6 is a graphical illustration depicting a three dimensional noise plot 600. In the exemplary embodiment, plot 600 may be represented as a waterfall plot, which represents a three dimensional plot of an upstream noise floor subplot 602 (e.g., similar to the noise floor subplot 504, FIG. 5) against time. In this example, an occurrence of CPD is indicated by a sudden/rapid step up 604 (i.e., MB) in amplitude of a noise floor subplot 602 at a particular time t. In the exemplary embodiment, the present algorithm may be configured to automatically report the particular times at which a MB occurrence of CPD is detected for a node being monitored. In an embodiment, the algorithm may be further configured to map the automatically reported times of CPD occurrence to even more accurately distinguish CPD from other potential noise or distortion sources.

In some embodiments, the present systems and methods are further configured to plot digital carrier levels indicating the signal to noise ratio (SNR), and/or potential upstream intermittent connections that may change RF levels. In at least one embodiment, the modified CPD detection technique avoids use of a gross power indicator for the noise floor, such that the detection algorithm does not confuse ingress for CPD.

In an exemplary embodiment, CPD may be further detected from triggered upstream spectrum analysis data using at least two different criteria that differentiate CPD from ingress or a regular noise source. Such innovative systems and methods are further capable of identifying excessive noise from any and all such detected sources.

In an exemplary embodiment, the modified CPD detection process may begin by collecting frequency data in the upstream bands of the transmission set at issue. In some cases, the collected frequency data may be obtained over a relatively short period of time. The minimum power level of the captured band data may then be used to determine the noise level of that band. In the exemplary embodiment, the determined noise level will be below the design limits for noise of the relevant transmission system, and the time interval for data collection may be selected to be sufficiently large enough to capture at least some quiet period on all frequency bands of interest, but also short enough to have a high degree of certainty that the noise floor will not change significantly over the time interval of sampling.

Next, the modified CPD detection process may further capture the frequency data of the signal in snapshots time intervals that are shorter in duration then the overall sampling time interval of the entire band. In the exemplary embodiment, the snapshot time intervals unable capture of the minimum signal level (described above). By repeating these snapshot data captures a plurality of times, a sufficient number of noise level data points may be gathered over time (e.g., one day). The snapshot time interval may, for example, be predetermined to be performed frequently enough to capture both slow trends in detail, as well as rapid changes to the data. Accordingly, for individual small bands of frequency, a sufficient quantity of data may be collected that provides a statistical representation over time for both small bands, and the full frequency band of interest.

By this modified CPD detection technique, changes over time may be more accurately tracked for both small and large frequency bands. Therefore, an algorithm for implementing this process may be further configured to look for rapid changes in the noise floor, which will indicate CPD occurrence, and also for noise levels in certain small frequency bands that indicate ingress of particular types. The simultaneous capture of data at two different intervals further advantageously functions to reveal relatively slower changes in noise that would be indicative of temperature effects.

In an exemplary embodiment, a modified CPD detection algorithm may be configured as computer-executable instructions stored in a memory of a communication device (e.g., of a modem/STB) in operable communication with a processor (e.g., also a modem), which, when executed by a processor, cause the communication device to perform the following steps: (1) collect the spectrum data over the interval of interest (e.g., the sampling interval), and find the noise floor for each sub-band of the collected spectrum data (e.g., at the snapshot interval); (2) save the collected data in the memory, and repeat these first two steps every x seconds, where x is a predetermined value; (3) perform a CPD analysis subprocess for the full spectral band and for each sub-band; and (4) filter the processed data from the previous step to remove and necessary trend data, such as a time of day effect, for example.

In at least one embodiment, the CPD analysis subprocess of the modified CPD detection algorithm may be performed according to the following substeps: (a) register as CPD noise each instance where the collected data exhibits a shift of y dB over z seconds, where y and z represent preselected values; (b) determining the maximum and minimum noise levels of the collected data over the complete sampling time interval of the full spectral band, and optionally register in the memory each occurrence of a rapid transition of the noise level between a predetermined percentage of the respective maximum and minimum values (e.g., also indicative of CPD); (c) for the full set of noise level data of the entire captured sampling time interval, execute a K-means clustering algorithm on at least three data clusters (e.g., maximum, intermediate, and minimum) and register in the memory, as CPD occurrences, instances of multiple data shifts between clusters (e.g., per day), or data shifts between maximum and minimum clusters without visiting an intermediate cluster therebetween; (d) generate, for each set of collected sub-band frequency data, statistics (e.g., maximum, minimum, average, variance, range, etc.) for each snapshot time interval sampled that may be further indicative of statistical anomalies (e.g., a large range value may indicate frequencies having larger problems; (e) translate the collected data into respective delta values, such that the translated data represents the difference between two collected data point values, that is, where the data is collected in equal data intervals; (f) optionally, plotting the translated data on a control or specification chart, and outlier data from the control chart may be indicative of a rapid change, and therefore CPD; and (g) generate an alert (e.g., a notification or alarm) for collected data or translated data determined to be outside of specification control limits.

Thus, after completion of the CPD analysis subprocess, the data collected over a substantial duration (e.g., a day) may be further processed to eliminate statistical trend data that is not needed to determine CPD. For example, in the case where a time-of-day statistical trend effect occurs, this effect may be removed from the collected data to generate only noise level data with the time of day effect removed, as illustrated further below with respect to FIG. 7. Once such statistical trend effects are removed, the remaining noise effect may be determined to be due to CPD or another intermittent noise problem. This determination may be made with significantly more precision by execution with respect to each of the sub-bands, as described above.

Figure 7:
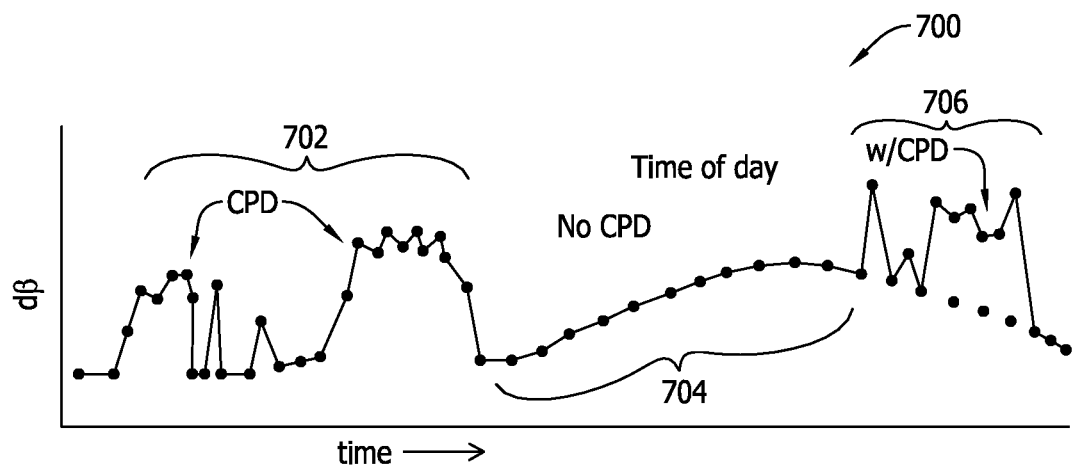
FIG. 7 is a graphical illustration depicting a noise effect plot.

FIG. 7 is a graphical illustration depicting a noise effect plot 700. In the embodiment depicted in FIG. 7, noise effect plot 700 represents a sequence of data points collected according to the processes and subprocesses described above, and over a significant duration of time including at least a first time of day interval 702, a second time of day interval 704, and a third time of day interval 706. First time of day interval 702 is therefore indicative of CPD on the collected data without a time of day effect (e.g., prior to occurrence, or after removal according to the present embodiments). Second time of day interval 704 indicates a time of day noise effect on the collected data without CPD. Third time of day interval 706 represents collected data exhibiting both CPD and the time of day effect. By removing the time of day effect (e.g., seen in second interval 704) from the collected data CPD may be more accurately determined irrespective of whether the signal is subject to a time of day effect (e.g., third interval 706) or is not subject to a time of day effect (e.g., first interval 702). In some embodiments, the time of day effect is removed prior to CPD analysis subprocess. In other embodiments, the time of day effect (or other unneeded statistical trend information) is removed after execution of the CPD analysis subprocess.

According to the present embodiments, the modified CPD detection processes and subprocesses may be applied to a large frequency band of interest (e.g., 5-40 MHz), and then to sub-bands of any predetermined width (e.g., 1-5 MHz) according to the chosen data collection method. By applying these particular CPD detection techniques to each sub-band, different types of noise may be detected from the same collection of data, and with significantly greater precision than may be obtained by conventional methods. As described above, by analyzing both the full band and multiple sub-bands, the modified CPD detection process of the present embodiments may accurately determine that small jump in the full band may, in fact, result from a large jump in only one sub-band, which would indicate non-CPD noise whereas a jump in all sub-bands of the full band would indicate CPD noise. Thus, the present systems and methods are advantageously configured to find changes in the overall noise that are abrupt, and such that the difference between the noise in sub-bands is relatively small. By examining both statistics in combination, the present embodiments are able to significantly increase the precision of CPD section.

Adaptive Polarization for a Transmission System

In an exemplary embodiment, the present systems and methods implement adaptive polarization for a transmission system by configuring a transmitter (i.e., a processor thereof) to determine, for each antenna in the serving group of the transmitter, which polarization settings may produce a maximum received signal, and which polarization settings may produce a minimum signal. The transmitter processor may then utilize these determined settings to enhance communications and minimize interference as follows.

In an embodiment, an adaptive polarization subsystem calculates an optimal polarization for each antenna served by the subsystem, and then may apply this optimal polarization for each single-cast burst transmission for each antenna. In some embodiments, the adaptive polarization subsystem is further configured to minimize a signal to one antenna, while providing an adequate signal to a different, target antenna. In the exemplary embodiment, the adaptive polarization subsystem generates one or more test signals, which may include a set of N OFDM pair blocks, to determine the polarization sensitivity per antenna. In at least one embodiment, the adaptive polarization subsystem is configured to implement customized signal synthesis for each user antenna such that each antenna may be tested for polarization sensitivity, for example, linear and/or circular polarization.

Figure 8:
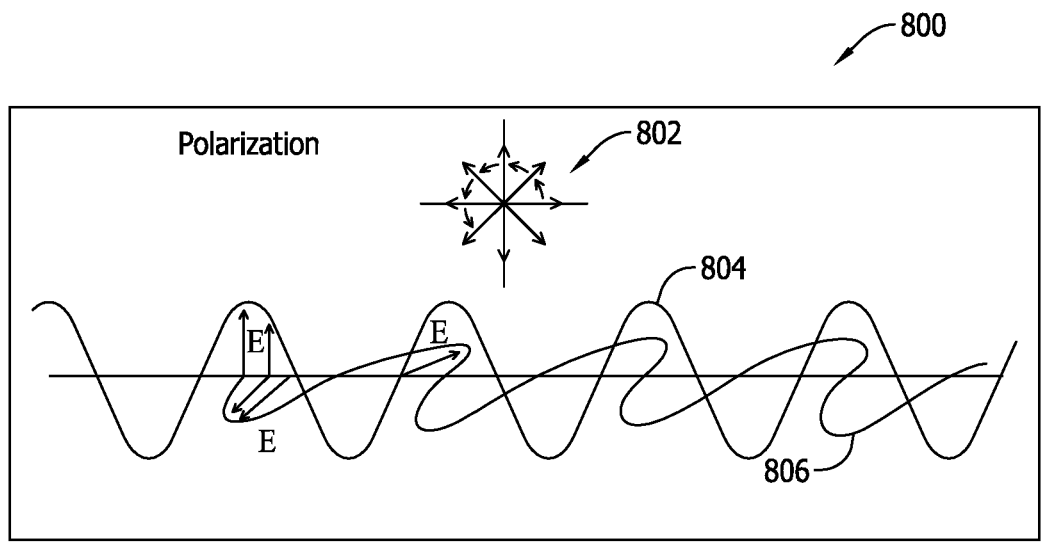
FIG. 8 is a graphical illustration depicting a circular polarization plot.

FIG. 8 is a graphical illustration depicting a circular polarization plot 800. In the embodiment depicted in FIG. 8, a circular polarization effect 802 may be created by a time (phase) shift between two respective E waves of equal amplitude, on a vertically polarized signal 804 and a horizontally polarized signal 806. Thus, as illustrated in FIG. 8, a relationship may be seen between the two types of linear polarization (i.e., vertical and horizontal) and the two types of circular polarization (i.e., clockwise and counterclockwise). In the following examples, because the H field is at right angles to the E field, the following discussion is limited to only examples describing the E field, for ease of explanation. Nevertheless, according to the embodiments described herein, an additional degree of freedom is provided in the case where a transmission system is, for each frequency, maximizing the signal strength for one user in one location while potentially minimizing the signal strength for another user in another location. Person of ordinary skill in the art will appreciate that systems and methods according to these advantageous techniques are particularly useful with respect to the multiple-input multiple-output (MIMO) transmission paradigm.

Figure 9:
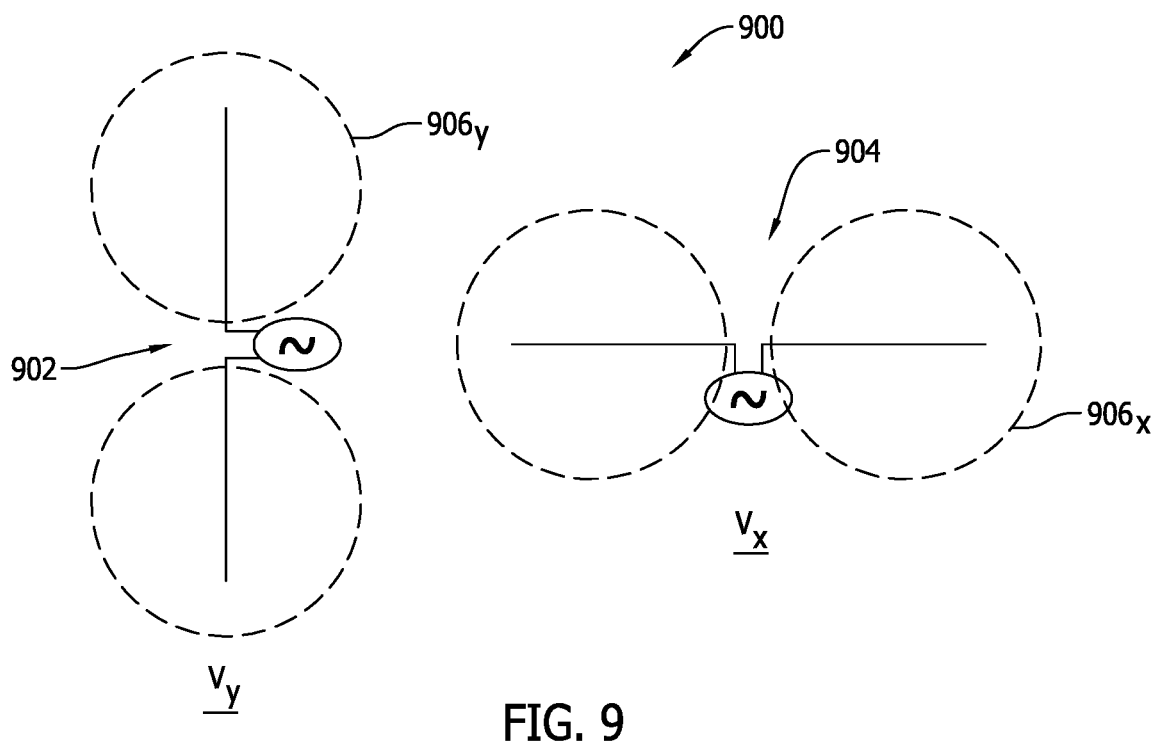
FIG. 9 is a graphical illustration depicting a sectional view of a dipole plot.

FIG. 9 is a graphical illustration depicting a sectional view of a dipole plot 900. In the embodiment illustrated in FIG. 9, dipole plot 900 includes a vertically polarized dipole plot 902 ($V_Y$) and horizontally polarized dipole plot 904 ($V_X$). Each of the polarized dipole plot 902, 904 exhibits a respective "doughnut" radiation pattern 906 (represented by the sectional dashed lines 906$y$, 906$x$ in FIG. 9). In this example, the vertical dipole $V_Y$ and the horizontal dipole $V_X$ are aligned adjacent one another. Nevertheless, as described below with respect to FIG. 10, vertical and horizontal dipoles may share the same physical center point.

Figure 10:
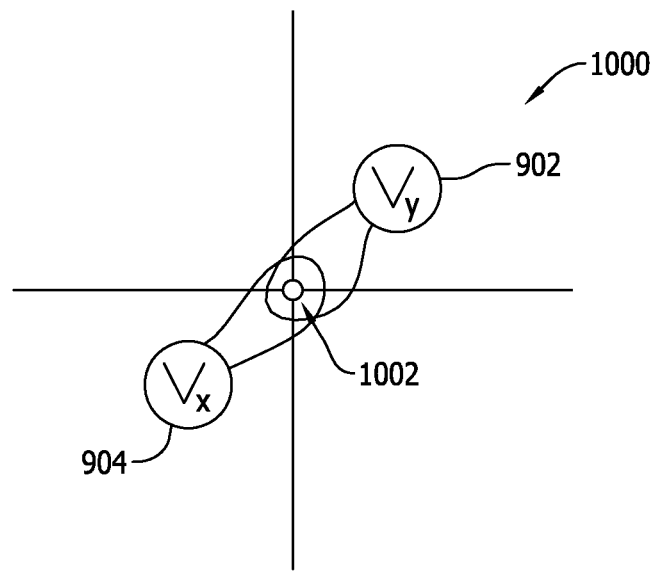
FIG. 10 is a graphical illustration depicting a cross array plot of the respective polarized dipole plots depicted in FIG. 9.

FIG. 10 is a graphical illustration depicting a cross array plot 1000 of respective polarized dipole plots 902, 904, FIG. 9. Cross array plot 1000 is similar to dipole plot 900, FIG. 9, except that, in this example, the vertical dipole $V_Y$ and the horizontal dipole $V_X$ share a same physical center point 1002.

Therefore, given a cross-antenna configuration established according to cross array plot 1000, a vertically polarized antenna and a horizontally polarized antenna (see FIG. 13, not shown in FIG. 10) may both transmit to a receiver (see FIG. 13, not shown in FIG. 10) at distant receive site. If both vertically and horizontally polarized antennas have identical sine waves applied to their respective terminals, and the signals therefrom are both in phase, a diagonal linearly polarized signal will be received by the receiver at the receive site. In contrast, if the sine wave is applied to only the vertically polarized antenna, the signal will be vertically polarized, whereas if the sine wave is applied to only the horizontally polarized antenna, the signal will be horizontally polarized.

However, in the case where the signals are delayed relative to one another by a +90 degree phase shift, a clockwise circular polarization will result. Similarly, in the case of a −90 degrees phase shift, a counterclockwise polarization will result. At the receive site, as the phase is gradually shifted on the vertically polarized antenna relative to the horizontally polarized antenna, and where both antennas are subjected to equal voltages, the radiated field will begin in a diagonally linearly polarized state, followed by a circular clockwise polarization state, then a negative diagonally linearly polarized state, a circular counterclockwise polarization state, and then back to diagonal over a 360 degree delay shift. Between the circular and linear polarizations, the respective patterns may appear elliptical. Examples of the several states and patterns are described further below with respect to FIGS. 14-17.

Figure 11:
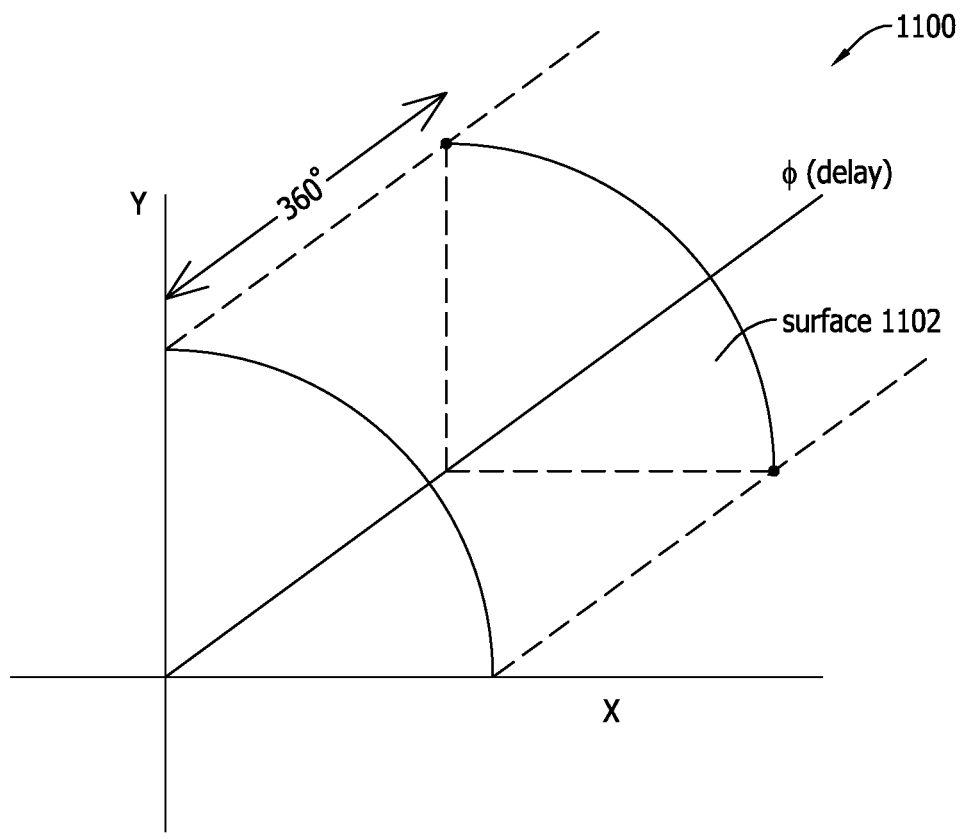
FIG. 11 is a graphical illustration depicting a three dimensional heat plot of a remote receiver antenna.
Figure 13:
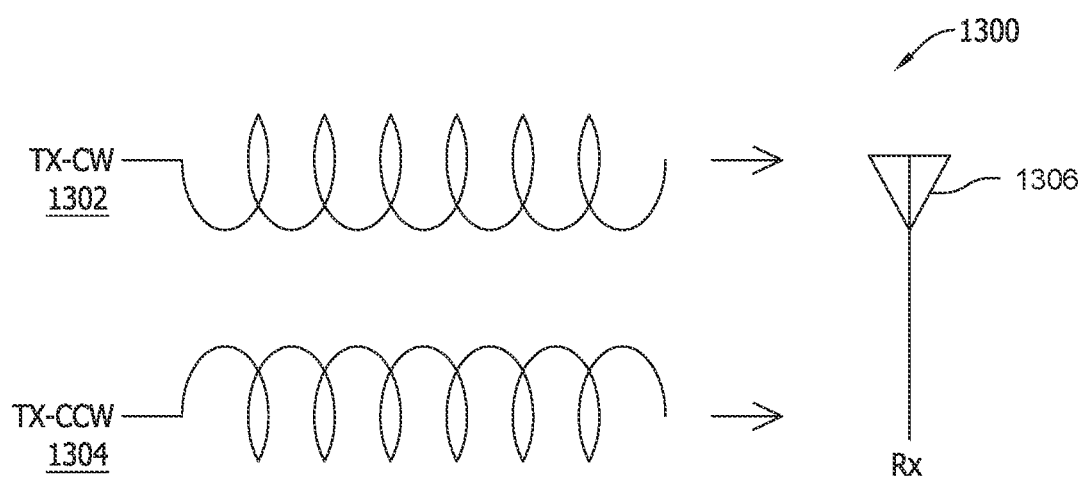
FIG. 13 is a schematic illustration depicting a communication system.

FIG. 11 is a graphical illustration depicting a three dimensional heat plot 1100 of a remote receiver antenna (see FIG. 13, not shown in FIG. 11). In an exemplary embodiment, three dimensional heat plot 1100 is particularly useful for determining where, for a remote receive antenna, the frequencies at which the received signal will be strongest and weakest, respectively.

More particularly, because the respective signal strength of the linear (both vertical and horizontal) and circular polarizations are expected to change in a relatively smooth manner, these respective values may be reliably plotted as a heat map on a 3-D grid (e.g., plot 1100). Accordingly, the values (i.e., heat) plotted on the heat map represent the respective voltages of a received signal at a single remote receive antenna. In an embodiment, the vector sum of all signals coming onto the single antenna may be multipath-dependent. In the exemplary embodiment depicted in FIG. 11, it is assumed that the signals applied to both the vertical antenna and the horizontal antenna will add up to a constant power (e.g., 0 dBm) and, according to this assumption, plot 1100 may be easily represented as values on a curved surface 1102.

Figure 12:
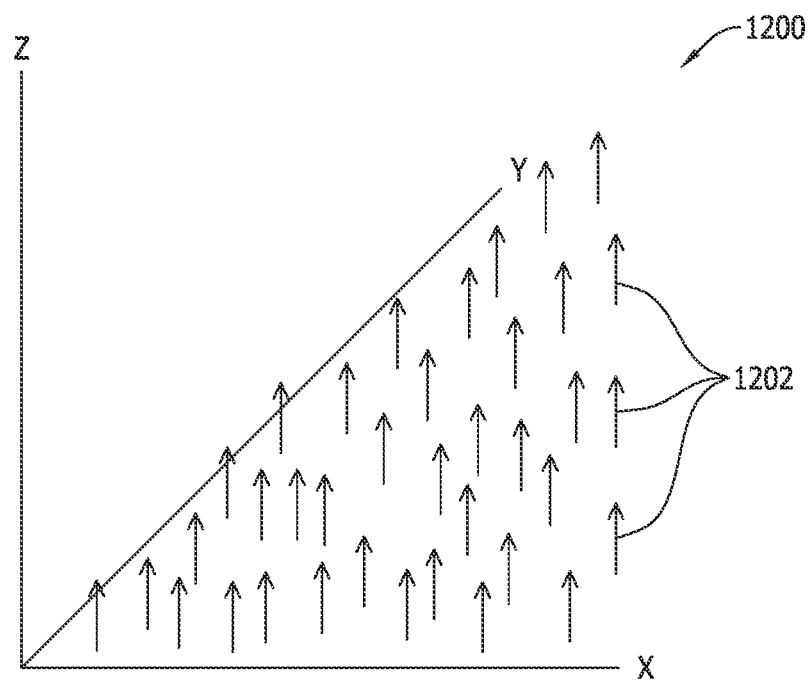
FIG. 12 is a graphical illustration depicting a contoured surface plot of the heat plot depicted in FIG. 11.

FIG. 12 is a graphical illustration depicting a contoured surface plot 1200 of heat plot 1100, FIG. 11. That is, contoured surface plot 1200 represents a different three dimensional plot generated by, after heat plot 1100 is determined, contoured surface 1102 is flattened onto the X-Y plane, and the received signal strength then plotted vertically on the Z-axis against the flattened surface 1102 on the X-Y plane. Plot 1200 therefore represents an alternative visualization of contoured surface 1102, where the respective heat values along surface 1102 may be represented as vectors in the Z-direction. Therefore, using one or both of the plotting techniques illustrated in FIGS. 11 and 12, where it is desirable to transmit a signal to a first antenna, but not to a second antenna, the signals may be transmitted according to a maximum value of the respective heat map of the first antenna, but according to a minimum value of the respective heat map of the second antenna.

FIG. 13 is a schematic illustration of a communication system 1300. In an embodiment, communication system 1300 includes a first transmitter antenna 1302 and a second transmitter antenna 1304 configured to transmit to a remote receiver antenna 1306. In the exemplary embodiment depicted in FIG. 13, first transmitter 1302 is clockwise circularly polarized (e.g., in the helical manner) with a first test signal, and second transmitter 1304 is counterclockwise circularly polarized (e.g., also helical) with a second test signal. In exemplary operation of medication system 1300, both of first transmitter antenna 1302 and second transmitter antenna 1304 are pointed in the general direction of remote receiver antenna 1306. Utilizing, for example, the respective mapping/plotting techniques of FIGS. 11 and 12, described above, the delays and signal powers of the respective transmitters are adjusted to realize an optimum signal vector sum to produce a maximum signal at the remote receiver. In the example depicted in FIG. 13, it is assumed, for ease of explanation, that a constant fixed amount of power is consumed between both transmitter antennas 1302, 1304.

Figure 14A:
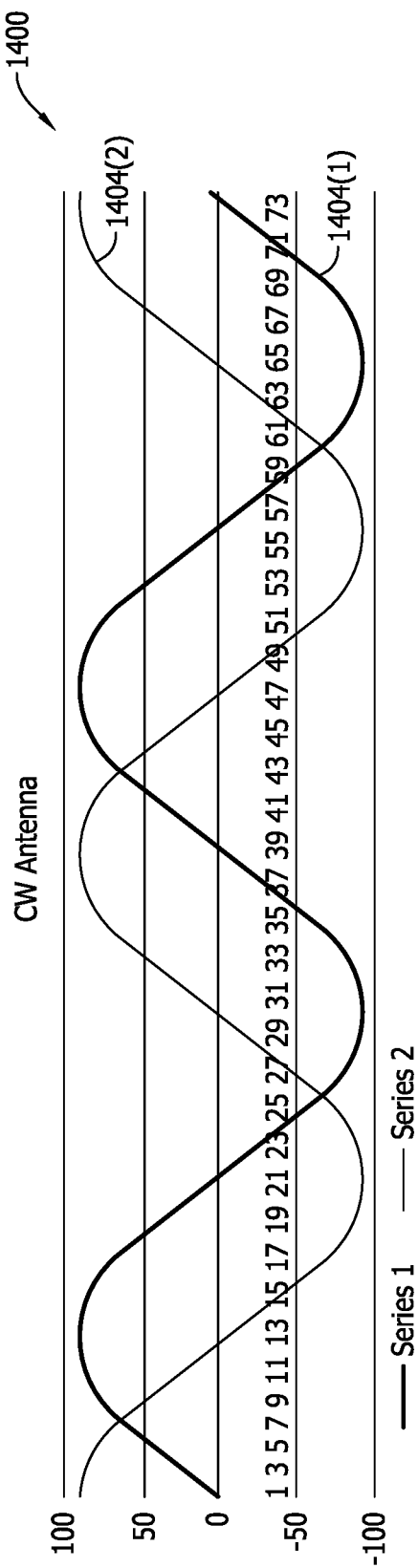
FIG. 14A is a graphical illustration depicting a spectral plot for a clockwise circularly polarized antenna.
Figure 14B:
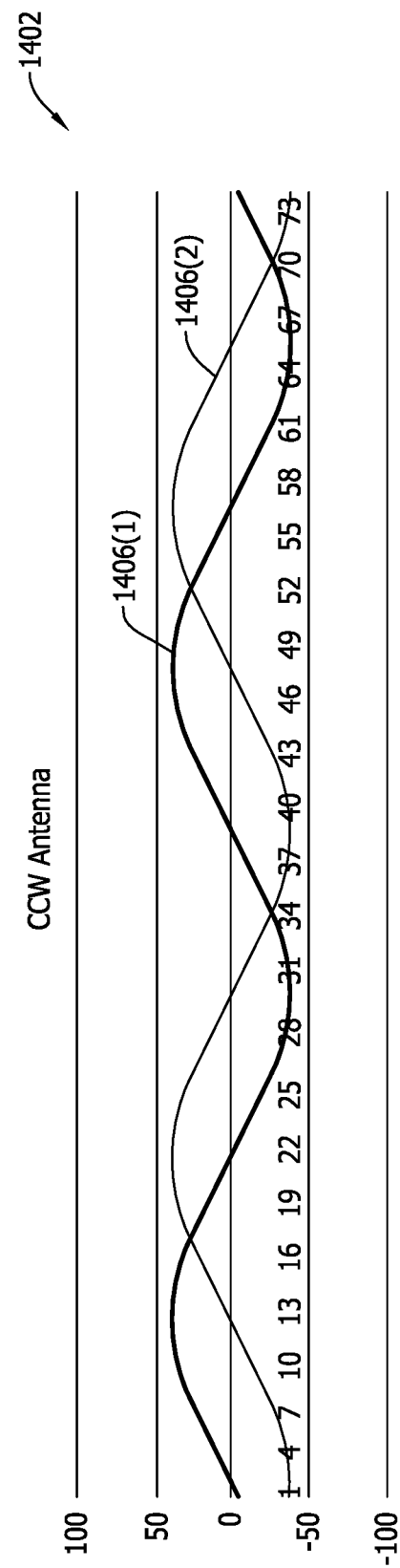
FIG. 14B is a graphical illustration depicting a spectral plot for a counter clockwise circularly polarized antenna.

FIG. 14A is a graphical illustration depicting a spectral plot 1400 for a clockwise circularly polarized antenna. FIG. 14B is a graphical illustration depicting a spectral plot 1402 for a counter clockwise circularly polarized antenna. More particularly, spectral plot 1400 depicts respective sine waves 1404(1), 1404(2) for first and second clockwise circularly polarized test data series, and spectral plot 1402 depicts respective sine waves 1406(1), 1406(2) for first and second counterclockwise circularly polarized test data series.

Figure 15:
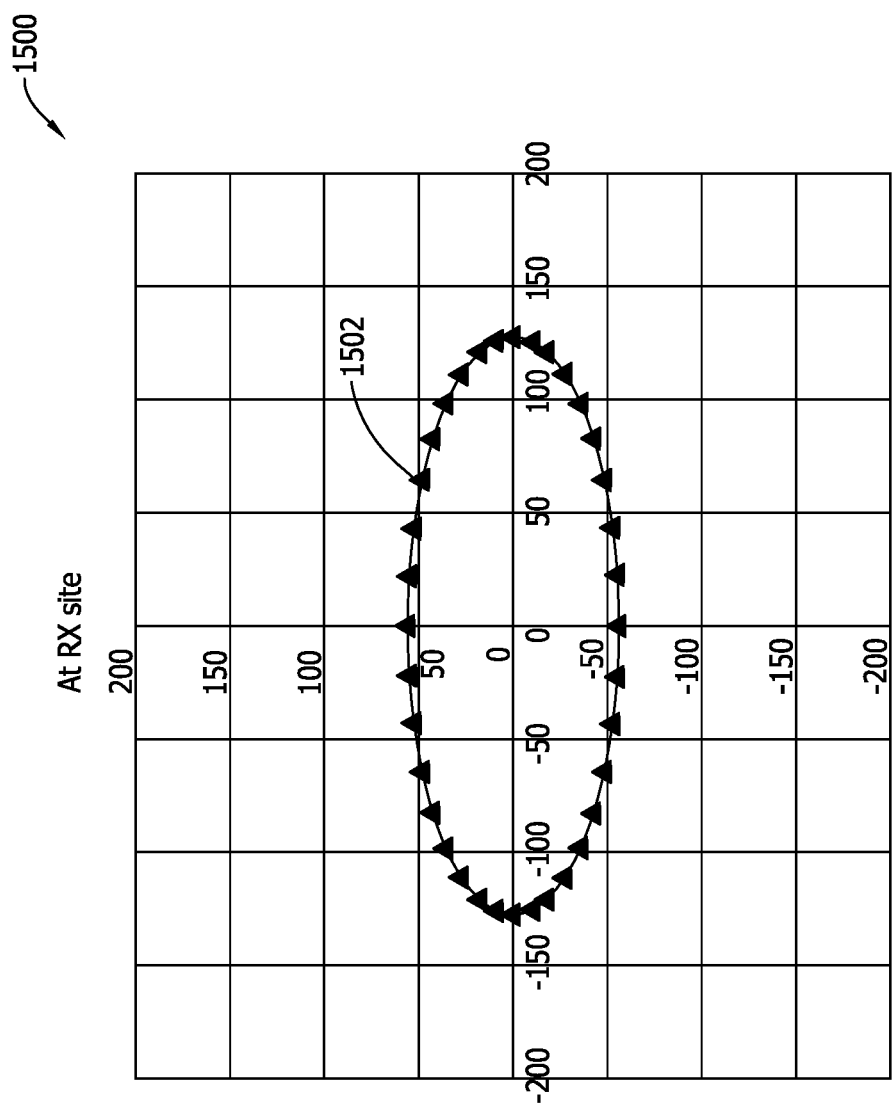
FIG. 15 is a graphical illustration depicting a combined field plot received from the circularly polarized antennas depicted in FIGS. 14A-B.

FIG. 15 is a graphical illustration depicting a combined field plot 1500 received from the circularly polarized antenna data depicted in FIGS. 14A-B. As can be seen from the embodiment depicted in FIG. 15, combined field plot 1500 is substantially elliptical, and symmetrically distributed vertically and horizontally.

Figure 16A:
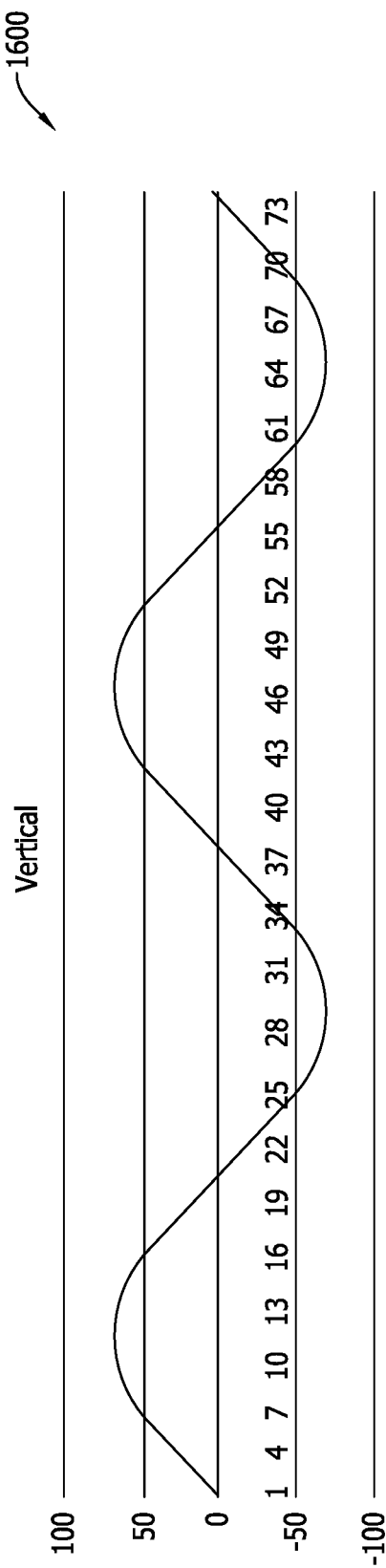
FIG. 16A is a graphical illustration depicting a spectral plot for a vertical linearly polarized antenna.
Figure 16B:
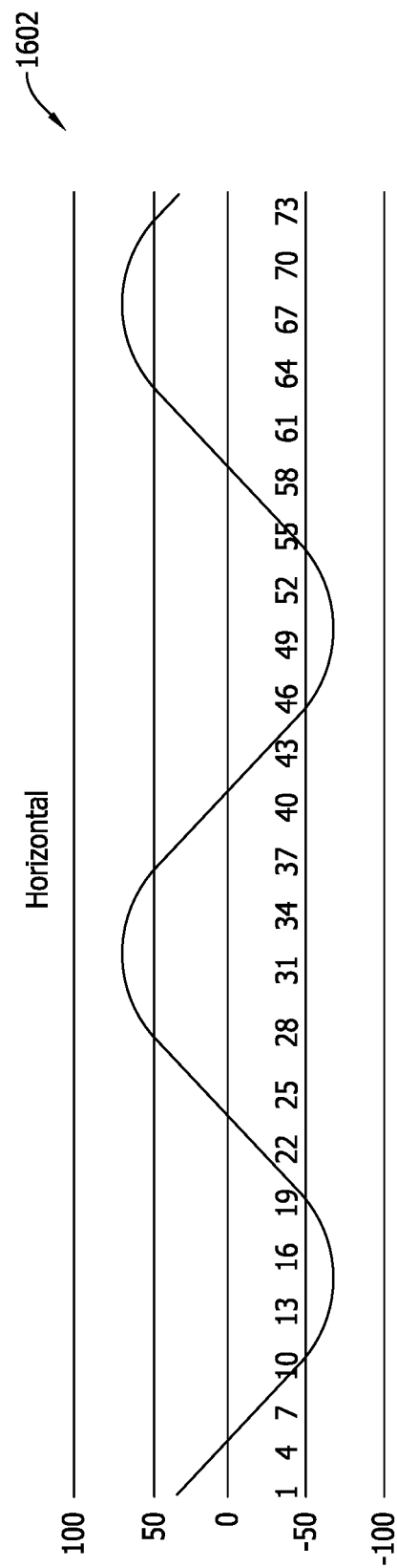
FIG. 16B is a graphical illustration depicting a spectral plot for a horizontal linearly polarized antenna.
Figure 17:
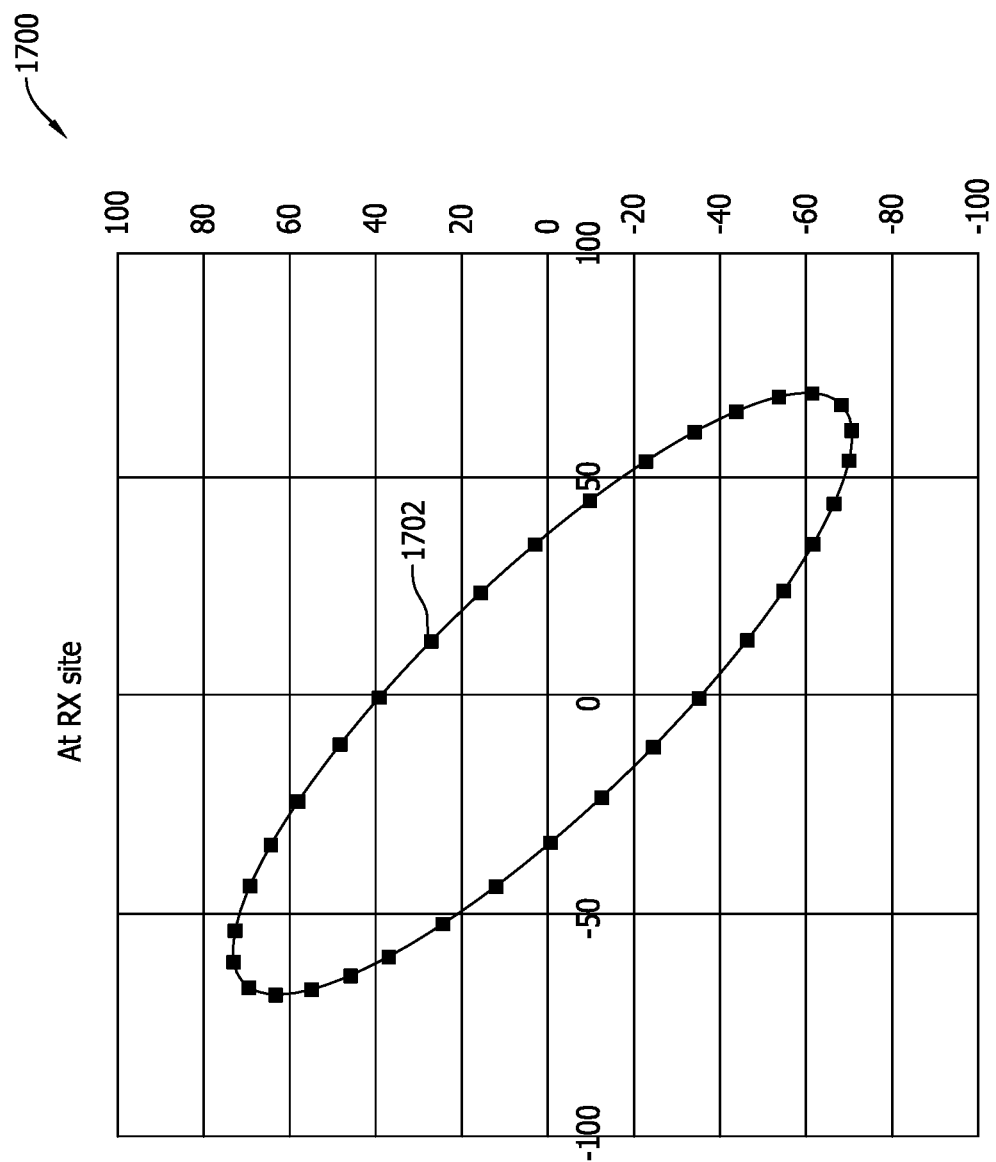
FIG. 17 is a graphical illustration depicting a combined field plot received from the combined field received at a distance from the linearly polarized antennas depicted in FIGS. 16A-B.

FIG. 16A is a graphical illustration depicting a spectral plot 1600 for a vertical linearly polarized antenna. FIG. 16B is a graphical illustration depicting a spectral plot 1602 for a horizontal linearly polarized antenna. FIG. 17 is a graphical illustration depicting a combined field plot 1700 received from the linearly polarized antenna data depicted in FIGS. 16A-B. As can be seen from the embodiment depicted in FIG. 17, combined field plot 1700 is also substantially elliptical, but in contrast to combined field plot 1500, FIG. 15, is not symmetrically distributed vertically or horizontally.

According to the advantageous embodiments described above, by setting both signal sources at the respective transmitter antennas to a zero value, and by changing the amplitude of the X drive relative to the Y drive, the linear polarization may advantageously be adjusted between the vertical and horizontal polarizations, and may be further adjusted to generate a diagonal polarization when the power is split evenly between the two transmitting antennas. Additionally, in elliptical polarization may be created by adding a relatively slight delay (e.g., 10 degrees) to one signal relative to the other signal. In the case where the amplitudes of the two respective signals are substantially equal, a relative +90-degree shift between the signals will create a clockwise circular polarization, whereas a relative −90 degree shift will create a counterclockwise circular polarization (also in the case of equal amplitudes).

In at least some embodiments, the polarization may be multipath-dependent. That is, in the case where the signal is reflected from a flat surface, the polarization may vary, and selectively favor one polarization over another. In an exemplary embodiment, in the case where a received site has two or more antennas, the site may be configured to report test results (i.e., of the test signal data) back to the respective transmitter of each transmitting antenna. The respective transmitter may then implement one or more of the techniques described above to select optimal magnitude and phase settings for the combined received signals from the multiple antennas at the receive site.

In an exemplary embodiment of the systems and methods described above, a transmitter may be configured to transmit a test signal having a predetermined number (e.g., 16) of magnitude/phase combinations, and the respective receiver may then be configured to select which of the predetermined number of combinations is optimal for that receiver. In some embodiments, the optimal selection by the receiver may be frequency dependent, and therefore the transmitted test signal may be an OFDM probe signal configured for a full band test. In at least one embodiment, different subcarriers may then each have their own "favorite" test signal, which represents the test signal generating the maximum magnitude therefore, without consideration of the received phase. Through these techniques, a transmitter may be advantageously configured to dynamically generate a modulated signal that is optimal for any given receiver encountered, and the given receiver may then be enabled to receive an "ideal" signal for each subcarrier thereof.

According to the advantageous systems and methods described herein, a transmitter is optimally configured to communicate effectively with essentially any antenna having an unknown polarization sensitivity. The present embodiments are thus advantageously further capable scaling to broadcast strong signals to significantly large populations. In some embodiments, this scaling may be performed using a driving test, or by polling a sample number of receivers, and applying one or more of the techniques described above thereto.

Therefore, in an exemplary embodiment, a test signal may be created by changing the amplitude and phase on two linearly polarized antennas, namely, one vertically polarized, and one horizontally polarized. A test electromagnetic wave may then be created by two antennas fed with two carrier waves sharing the same frequency, but at different respective amplitudes and phases. As an amplitude of one wave is varied with respect to an amplitude of the other wave, the linear polarization of a remote antenna may be determined, as described above. As the phase (delay) of the first signal is varied with respect to the other signal, the left or right circular polarization of a remote receiving antenna may be determined. After the optimum polarization receive settings are determined, a relevant transmitter may use the determined settings to optimally communicate with the respective receive antenna. As described above, similar innovative techniques may be implemented with respect to circularly polarized antennas, as opposed to linearly polarized antennas.

In at least one exemplary embodiment, multiple pairs (e.g., 16 pairs) of OFDM signal blocks are applied to two separate transmitting antennas for simultaneous transmission. A remote receiving antenna may then determine which of the signal block pairs was "best" for that receiver, and then report this determination back to the transmitter. The transmitter the then utilize this optimal setting for future communications with that receiver, whether the respective polarization is linear or circular.

The embodiments herein are described above with respect to optical, FTTH, HFC, RFoG, and conventional cable communication networks. These several types of communications systems are discussed by way of example, and are not intended to be limiting. Other types of communication networks and systems are contemplated herein without departing from the scope of the invention. Different protocols for these networks may implement different components to perform similar functions. For example, a headend or hub of the network may utilize an Optical Network Terminal (ONT) or an Optical Line Termination (OLT), and/or an ONU, and one or more optical protocols including without limitation EPON, RFoG, or GPON. Other embodiments that are contemplated include communication systems capable of x-hauling traffic, as well as satellite operator communication systems, Wi-Fi networks, MIMO communication systems, microwave communication systems, short and long haul coherent optic systems, etc. X-hauling is defined herein as any one of or a combination of fronthauling, backhauling, and mid-hauling.

The embodiments described above may be implemented by, or in cooperation with, a termination unit such as an ONT, an OLT, a Network Termination Unit, a Satellite Termination Unit, a cable modem termination system (CMTS), and/or other termination systems which may be collectively referred to as a "Modem Termination System" (MTS). Such systems and methods may be further implemented using a modem device, such as a cable modem (CM), a satellite modem, an Optical Network Unit (ONU), a DSL unit, etc., which are collectively referred to as "modems." Furthermore, the DOCSIS protocol may be substituted with, or further include protocols such as EPON, RFoG, GPON, Satellite Internet Protocol, without departing from the scope of the embodiments herein. The present embodiments are therefore particularly useful for communication systems implementing a DOC SIS protocol, and may be advantageously configured for use in existing 4G and 5G networks, and also for new radio and future generation network implementations.

Exemplary embodiments of systems and methods for noise detection and mitigation, as well as polarization optimization, are described above in detail. The systems and methods of this disclosure though, are not limited to only the specific embodiments described herein, but rather, the components and/or steps of their implementation may be utilized independently and separately from other components and/or steps described herein.

Although specific features of various embodiments may be shown in some drawings and not in others, this is for convenience only. In accordance with the principles of the systems and methods described herein, any feature of a drawing may be referenced or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a programmable logic unit (PLU), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A transmitter configured to transmit data to a receiver over a communications network, the transmitter comprising:
   a processor; and
   a memory in operable communication with the processor, the memory storing computer-executable instructions, which, when executed by the processor, cause the processor to:
   (i) collect spectrum data of a spectral band over a first sampling interval;
   (ii) store the collected spectrum data in the memory;
   (iii) sample the collected spectrum data, over a second sampling interval less than the first sampling interval, for a plurality of sub-bands within the spectral band;
   (iv) analyze the spectral band and each sub-band for indications of common path distortion (CPD);
   (v) calculate, for each sub-band, an amplitude difference between successively stored noise floor amplitudes sampled within a same sub-band; and
   (vi) determine, based on the calculated noise floor amplitude differences for each sub-band, the presence of CPD in at least one sub-band from a steep noise floor amplitude rise between the successively stored noise floors within the at least one sub-band.

2. The transmitter of claim 1, wherein the instructions further cause the processor to determine a noise floor for each sub-band of the collected spectrum data store the determined noise floor in the memory.

3. The transmitter of claim 2, wherein the instructions further cause the processor to detect the steep rise in noise floor amplitude by comparing a first stored determined noise floor of a first sub-band with a second stored determined noise floor of a second sub-band immediately succeeding the first sub-band.

4. The transmitter of claim 1, wherein the instructions further cause the processor to filter statistical trend data from the collected spectrum data.

5. The transmitter of claim 1, further comprising at least one of an optical network unit, a modem, and a DSL unit.

6. A transmitter configured to transmit data to a receiver over a communications network, the transmitter comprising:
   a processor; and
   a memory in operable communication with the processor, the memory storing computer-executable instructions, which, when executed by the processor, cause the processor to:
   (i) collect spectrum data of a spectral band over a first sampling interval;
   (ii) store the collected spectrum data in the memory;

(iii) sample the collected spectrum data, over a second sampling interval less than the first sampling interval, for a plurality of sub-bands within the spectral band;

(vii) filter statistical trend data from the collected spectrum data; and (iv) analyze the spectral band and each sub-band, and each sub-band with respect to the spectral band and other sub-bands, for indications of common path distortion (CPD) and non-CPD noise, based on a comparison between amplitude jumps in different sub-bands.

7. The transmitter of claim 6, wherein the instructions further cause the processor to filter the statistical trend data after analyzing the spectral band.

8. The transmitter of claim 6, wherein the statistical trend data includes a time of day effect.

9. The transmitter of claim 1, further comprising at least one of an optical network unit, a modem, and a DSL unit.

10. A transmitter configured to transmit data to a receiver over a communications network, the transmitter comprising:
    an adaptive polarization subsystem including a first transmitting antenna and a second transmitting antenna;
    a processor; and
    a memory in operable communication with the processor, the memory storing computer-executable instructions, which, when executed by the processor, cause the processor to:
    (i) collect spectrum data of a spectral band over a first sampling interval;
    (ii) store the collected spectrum data in the memory;
    (iii) sample the collected spectrum data, over a second sampling interval less than the first sampling interval, for a plurality of sub-bands within the spectral band;
    (ii) analyze the spectral band and each sub-band for indications of common path distortion (CPD); and
    (iii) inject a test signal, for detection by the communications network, to the first transmitting antenna at a first polarization, and to the second transmitting antenna at a second polarization different than the first polarization, such that the same injected test signal is transmitted by first and second antennas at the first and second polarizations, respectively.

11. A transmitter configured to transmit data to a receiver over a communications network, the transmitter comprising:
    an adaptive polarization subsystem including a first transmitting antenna and a second transmitting antenna;
    a processor; and
    a memory in operable communication with the processor, the memory storing computer-executable instructions, which, when executed by the processor, cause the processor to:
    (a) collect spectrum data of a spectral band over a first sampling interval;
    (b) store the collected spectrum data in the memory;
    (c) sample the collected spectrum data, over a second sampling interval less than the first sampling interval, for a plurality of sub-bands within the spectral band;
    (d) analyze the spectral band and each sub-band for indications of common path distortion (CPD); and
    (e) inject a test signal, for detection by the communications network, to (i) the first transmitting antenna as a first electromagnetic carrier wave having a vertical linear polarization, and (ii) the second transmitting antenna as a second electromagnetic carrier wave having a horizontal linear polarization.

12. The transmitter of claim 11, wherein the first electromagnetic carrier wave has the same frequency as the second electromagnetic carrier wave.

13. The transmitter of claim 12, wherein the first electromagnetic carrier wave has a different amplitude and phase from the second electromagnetic carrier wave.

14. The transmitter of claim 13, wherein the processor is further configured to determine an optimum polarization for the receiver based on a variance of the amplitude between the first electromagnetic carrier wave and the second electromagnetic carrier wave.

15. A transmitter configured to transmit data to a receiver over a communications network, the transmitter comprising:
    an adaptive polarization subsystem including a first transmitting antenna and a second transmitting antenna;
    a processor; and
    a memory in operable communication with the processor, the memory storing computer-executable instructions, which, when executed by the processor, cause the processor to:
    (a) collect spectrum data of a spectral band over a first sampling interval;
    (b) store the collected spectrum data in the memory;
    (c) sample the collected spectrum data, over a second sampling interval less than the first sampling interval, for a plurality of sub-bands within the spectral band;
    (d) analyze the spectral band and each sub-band for indications of common path distortion (CPD); and
    (e) inject a test signal, for detection by the communications network, to (i) the first transmitting antenna as a first electromagnetic carrier wave having a clockwise circular polarization, and (ii) the second transmitting antenna as a second electromagnetic carrier wave having a counter clockwise circular polarization.

16. The transmitter of claim 10, wherein the test signal includes a plurality of OFDM signal block pairs.

17. The transmitter of claim 10, further comprising at least one of an optical network unit, a modem, and a DSL unit.

18. A processor for a communications network, the processor in operable communication a memory storing computer-executable instructions therein, which, when executed by the processor, cause the processor to:
    (a) collect spectrum data of a spectral band over a first sampling interval;
    (b) store the collected spectrum data in the memory; and
    (c) sample the collected spectrum data, over a second sampling interval less than the first sampling interval, for a plurality of sub-bands within the spectral band; and
    (d) analyzing the spectral band and each sub-band for indications of common path distortion (CPD), by
        (i) registering, as CPD noise, each instance where the collected spectrum data exhibits a greater than a predetermined amplitude shift over a pre-selected time sub-interval,
        (ii) determining a maximum noise level and a minimum noise level of the collected data over the first sampling interval of the spectral band,
        (iii) executing a K-means clustering algorithm on at least three data clusters of the collected spectrum data, and
        (iv) recording a data shift between two of the at least three data clusters occurring in less than pre-selected time sub-interval, generating a control chart including each recorded data shift indicating an occurrence of common path distortion.

19. The processor of claim 18, further comprising a transmitter configured for communication with the communications network.

20. The processor of claim 19, wherein the transmitter comprises at least one of an optical network unit, a modem, and a DSL unit.

* * * * *